(12) United States Patent
Krauss et al.

(10) Patent No.: US 9,073,568 B2
(45) Date of Patent: Jul. 7, 2015

(54) DISPLAY AND OPERATING SYSTEM OF A MOTOR VEHICLE INCLUDING AN OUTER LEFT-HAND DISPLAY DEVICE AND AN OUTER RIGHT-HAND DISPLAY DEVICE

(75) Inventors: Lutz Krauss, Karlsruhe (DE); Timo Seehaus, Steinheim (DE); Rolf Hartmann, Stuttgart (DE); Albrecht Boettiger, Grafenau-Doeffingen (DE); Thomas Mim, Leonberg (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 217 days.

(21) Appl. No.: 13/581,013

(22) PCT Filed: Dec. 18, 2010

(86) PCT No.: PCT/EP2010/007769
§ 371 (c)(1),
(2), (4) Date: Aug. 24, 2012

(87) PCT Pub. No.: WO2011/103904
PCT Pub. Date: Sep. 1, 2011

(65) Prior Publication Data
US 2012/0319828 A1   Dec. 20, 2012

(30) Foreign Application Priority Data
Feb. 25, 2010   (DE) .......................... 10 2010 010 446

(51) Int. Cl.
*G08B 21/00* (2006.01)
*B62D 1/04* (2006.01)
(Continued)

(52) U.S. Cl.
CPC ................ *B62D 1/046* (2013.01); *B60K 35/00* (2013.01); *B60K 37/02* (2013.01); *B60K 37/06* (2013.01);
(Continued)

(58) Field of Classification Search
CPC ........ B06K 35/00; B06K 37/02; B06K 37/06; B62D 1/046
USPC .............. 340/425.5, 438, 439, 441, 456, 459, 340/461, 462; 345/7, 87, 102
See application file for complete search history.

(56) References Cited

U.S. PATENT DOCUMENTS 6,244,986 B1   6/2001   Mori et al.
7,801,661 B2   9/2010   Masterson et al.
(Continued)

FOREIGN PATENT DOCUMENTS

DE   19533829 C1   9/1996
DE   19941947 A1   3/2001
(Continued)

OTHER PUBLICATIONS

European Patent Office, International Search Report in International Patent Application No. PCT/EP2010/007769 (Apr. 21, 2011).
(Continued)

*Primary Examiner* — Mark Rushing
(74) *Attorney, Agent, or Firm* — Leydig, Voit & Mayer, Ltd.

(57) ABSTRACT

A display and operating system of a motor vehicle includes an instrument cluster that is formed by a plurality of display devices and has an outer left-hand display device and an outer right hand display device. A steering wheel of the system includes an outer left-hand operating device configured exclusively for driver interaction with the outer left-hand display device of the instrument cluster and an outer right-hand operating device configured exclusively for driver interaction with the outer right-hand display device of the instrument cluster. Further devices, including at least one of a display device or an operating device, are disposed laterally adjacent to the instrument cluster.

10 Claims, 5 Drawing Sheets

(51) Int. Cl.
*B60K 35/00* (2006.01)
*B60K 37/02* (2006.01)
*B60K 37/06* (2006.01)
*B60Q 3/04* (2006.01)

(52) U.S. Cl.
CPC ......... *B60Q 3/046* (2013.01); *B60K 2350/1008* (2013.01); *B60K 2350/106* (2013.01); *B60K 2350/1064* (2013.01); *B60K 2350/925* (2013.01); *B60K 2350/928* (2013.01); *B60K 2350/965* (2013.01)

(56) References Cited

U.S. PATENT DOCUMENTS

| | | |
|---|---|---|
| 2003/0137278 A1 | 7/2003 | Kondo |
| 2006/0092001 A1* | 5/2006 | Yokota et al. ............... 340/425.5 |
| 2007/0078598 A1* | 4/2007 | Watanabe et al. ............. 701/211 |
| 2007/0138822 A1* | 6/2007 | Feit et al. ......................... 296/70 |
| 2008/0081729 A1 | 4/2008 | Sauvlet et al. |
| 2008/0162012 A1 | 7/2008 | Masuda et al. |
| 2008/0190681 A1 | 8/2008 | Mayser et al. |
| 2008/0306670 A1* | 12/2008 | Masterson et al. .............. 701/99 |
| 2009/0140700 A1 | 6/2009 | Eberhard et al. |
| 2010/0052888 A1* | 3/2010 | Crowe et al. .................. 340/461 |

FOREIGN PATENT DOCUMENTS

| | | |
|---|---|---|
| DE | 10346112 A1 | 4/2005 |
| DE | 102004020111 A1 | 11/2005 |
| DE | 102005012715 A1 | 5/2006 |
| DE | 102005036923 A1 | 2/2007 |
| DE | 102007016621 A1 | 10/2007 |
| DE | 102007012305 A1 | 9/2008 |
| DE | 102008024234 A1 | 12/2008 |
| DE | 102007052261 A1 | 5/2009 |
| EP | 1275553 A2 | 1/2003 |
| EP | 1769963 A1 | 4/2007 |
| FR | 2868739 A1 | 10/2005 |
| JP | 2006151341 A | 6/2006 |
| JP | 2006258783 A | 9/2006 |
| JP | 2007106353 A | 4/2007 |
| JP | 2007125921 A | 5/2007 |
| JP | 2008049816 A | 3/2008 |
| JP | 2008081106 A | 4/2008 |
| JP | 2009143355 A | 7/2009 |
| WO | WO 0160650 A1 | 8/2001 |

OTHER PUBLICATIONS

German Patent Office, Search Report in German Patent Application No. 10 2010 010 446.9 (Feb. 25, 2010).

* cited by examiner

DISPLAY AND OPERATING SYSTEM OF A MOTOR VEHICLE INCLUDING AN OUTER LEFT-HAND DISPLAY DEVICE AND AN OUTER RIGHT-HAND DISPLAY DEVICE

CROSS REFERENCE TO RELATED APPLICATIONS

This application is a U.S. National Phase application under 35 U.S.C. §371 of International Application No. PCT/EP2010/007769, filed on Dec. 18, 2010, and claims benefit to German Patent Application No. DE 10 2010 010 446.9, filed on Feb. 25, 2010. The International Application was published in German on Sep. 1, 2011, as WO 2011/103904 A1 under PCT Article 21 (2).

FIELD

The invention relates to a display and operating system of a motor.

BACKGROUND

In motor vehicles known from practice there are installed a multiplicity of display devices and operating devices which together form a display and operating system of a motor vehicle. For example, motor vehicles known from practice have an instrument cluster which comprises a plurality of display devices, for example a vehicle speed display device, an engine speed display device and a display device for displaying the fill level of a fuel tank and for displaying an engine temperature. In hybrid vehicles, a state of charge of an electrical energy store can typically also be displayed on a display device of the instrument cluster. An instrument cluster of a motor vehicle is described for example from DE 10 2004 020 111 A1

Furthermore, it is already known from practice to assign operating devices to a steering wheel of the motor vehicle. Furthermore, display devices and/or operating devices, for example a display device of a navigation system, may be installed laterally adjacent to the instrument cluster, in particular in the region of a central console or as an extension of the central console in the region of a dashboard.

Accordingly, a multiplicity of display devices and operating devices are installed in motor vehicles known from practice. Known display and operating systems however have restricted functionality for the driver, in particular restricted operator convenience.

SUMMARY

In an embodiment, the present invention provides a display and operating system of a motor vehicle including an instrument cluster that is formed by a plurality of display devices and has an outer left-hand display device and an outer right hand display device. A steering wheel of the system includes an outer left-hand operating device configured exclusively for driver interaction with the outer left-hand display device of the instrument cluster and an outer right-hand operating device configured exclusively for driver interaction with the outer right-hand display device of the instrument cluster. Further devices, including at least one of a display device or an operating device, are disposed laterally adjacent to the instrument cluster.

BRIEF DESCRIPTION OF THE DRAWINGS

Exemplary embodiments of the present invention are explained in more detail below with reference to the drawings, in which.

DETAILED DESCRIPTION

Figure 1:
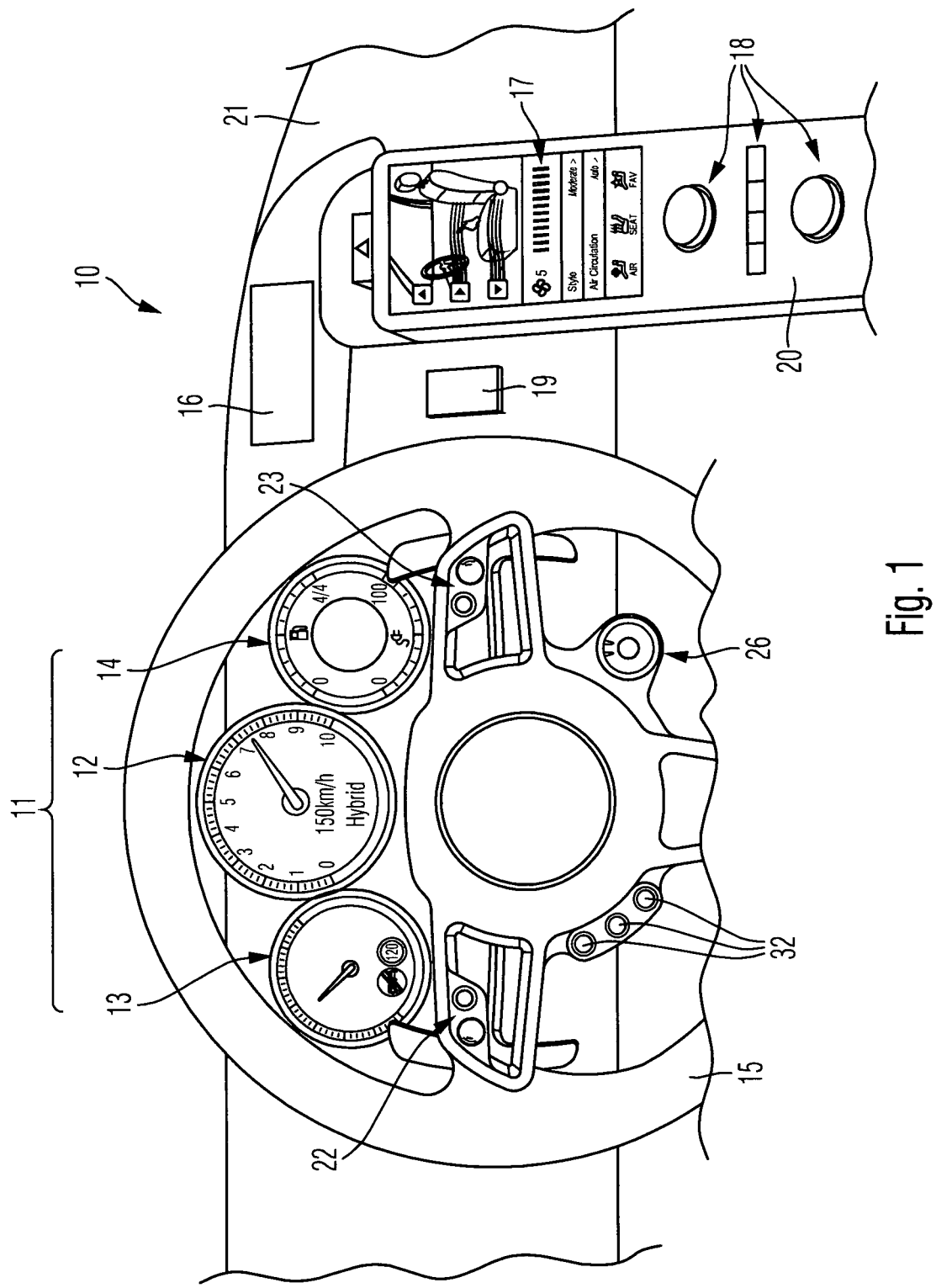
FIG. 1 shows a schematic illustration of a display and operating system according to the invention of a motor vehicle.

In an embodiment, the present invention provides a novel display and operating system of a motor vehicle with improved functionality. The steering wheel comprises an outer left-hand operating device which serves exclusively for driver interaction with an outer left-hand display device of the instrument cluster, and an outer right-hand operating device which serves exclusively for driver interaction with an outer right-hand display device of the instrument cluster.

The present invention proposes for the first time that two operating devices be provided on a steering wheel of the motor vehicle, which operating devices are assigned to two display devices on the same sides, respectively, of the instrument cluster of the motor vehicle, specifically in such a way that a left-hand operating device of the steering wheel serves exclusively for interaction with a left-hand display device of the instrument cluster, and a right-hand operating device serves exclusively for interaction with a right-hand display device of the instrument cluster. This increases the functionality, in particular the operator convenience, of a display and operating system of a motor vehicle.

The steering wheel of the motor vehicle preferably furthermore comprises an operating device which is in the form of an operating mode selecting device and which has a rotatable selecting element by means of which at least one of the operating modes of purely electric-motor-powered driving and/or purely combustion-engine-powered driving and/or combined electric-motor-powered and combustion-engine-powered driving can be selected or activated by the driver, and which furthermore has a button-like boost selecting element by means of which electric-motor-powered boosting as a special case of combined electric-motor-powered and combustion-engine-powered driving can be selected or activated by the driver. By means of the operating mode selecting device which is assigned to the steering wheel and which comprises the rotatable selecting element and the button-like boost selecting element, the operator convenience for a driver can be further increased because operating modes for the motor vehicle can be selected or activated with certainty and reliably by a driver.

In one advantageous refinement of the invention, a backlighting, in particular a color of the backlighting, of display devices and/or operating devices of the display and operating system changes as a function of the operating mode selected or activated by means of the operating mode selecting device. If the backlighting of the display devices and operating devices of the display and operating system changes as a function of the operating mode selected by means of the operating mode selecting device, a driver can readily identify the operating mode in which the vehicle is operating not only on the basis of an isolated display on a display device but rather from the overall appearance of the display and operating system.

A display device of the instrument cluster, in particular a central display device thereof, preferably comprises a first display area for quantitative power display and a second display area for qualitative power display. If both a quantitative power display and also a qualitative power display are realized on a display device, a driver can adapt his driving behavior in an ideal manner and better understand the driving behavior of the motor vehicle.

In one advantageous refinement of the invention, at least one, preferably every display device of the instrument cluster comprises a circular LCD display. Optimum integration of display functions into the display device is possible through the use of circular LCD displays in the display devices of the instrument cluster. In particular, display areas realized at the outer periphery of the display device can be reproduced by means of the LCD display, as a result of which it is then possible to dispense with separate LEDs for said radially outer display areas.

FIG. 1 shows a schematic illustration of a display and operating system 10 according to an embodiment of the invention of a motor vehicle, which display and operating system comprises a plurality of display devices and operating devices.

The display and operating system has a so-called instrument cluster 11 which, in the exemplary embodiment shown, is formed by three display devices 12, 13, 14 which are combined to form the instrument cluster 11, specifically a central display device 12 and two lateral display devices 13 and 14, wherein the display device 13 is positioned to the left-hand side of the central display device 12 and the display device 14 is positioned to the right-hand side of the display device 12.

It is also possible for more than three display devices to be combined to form an instrument cluster or for only two display devices to be combined to form an instrument cluster.

In the exemplary embodiment shown, the central display device 12 of the instrument cluster 11 serves primarily as an engine speed display. The left-hand display device 13 of the instrument cluster 11 serves primarily as a vehicle speed display. The right-hand display device 14 of the instrument cluster 11 serves primarily as a fuel tank fill level display and, if the motor vehicle is a hybrid vehicle, a display of the state of charge of an electrical energy store.

The display devices 12, 13 and 14 which are combined to form the instrument cluster 11 are situated in the direct field of vision of a driver and can be seen directly through a steering wheel 15 of the motor vehicle, wherein the steering wheel 15 is assigned a plurality of operating devices which will be discussed in detail further below.

Laterally adjacent to the instrument cluster 11 there are positioned further display devices and/or operating devices, for example a display device 16 of a navigation system, a display device 17 of a comfort and/or entertainment system, operating devices 18 of the comfort and/or entertainment system, and an operating device 19 of a transmission.

Here, the display device 17 and the operating devices 18 of the comfort and/or entertainment system are positioned in the region of a central console 20 of the motor vehicle. The display device 16 of the navigation system is integrated into a dashboard 21, specifically laterally adjacent to the instrument cluster 11 as an extension of the central console 20. The operating device 19 of the transmission, which is a transmission selector lever, is likewise integrated into the dashboard 21, specifically below the display device 16 of the navigation system between the central console 20 and instrument cluster 11.

As already mentioned, a plurality of operating devices is assigned to the steering wheel 15. The steering wheel 15 comprises an outer left-hand operating device 22 which serves exclusively for driver interaction with the outer left-hand display device 13 of the instrument cluster 11, and an outer right-hand operating device 23 which serves exclusively for driver interaction with the outer right-hand display device 14 of the instrument cluster 11.

Both the outer left-hand operating device 22 of the steering wheel 15 and also the outer right-hand operating device 23 of the steering wheel 15 have in each case two input devices. Each of said operating devices 22 and 23 comprises in each case one rotary-barrel-like input device 24, by means of the rotation and pressing of which a display mode or interaction mode of the respective display device 13 or 14 of the instrument cluster 11 can be selected and confirmed. In particular, it is possible by rotating and pressing the rotary-barrel-like input device 24 of the respective operating device 22 or 23 to navigate in a hierarchical display menu or interaction menu of the respective display device 13 or 14 of the instrument cluster 11, and for the driver to select a display mode or interaction mode from the respective display menu or interaction menu. By means of a button-like input device 25 of the respective operating device 22 or 23 of the steering wheel 15, it is possible to return out of display mode or interaction mode of the respective display device 13 or 14 of the instrument cluster 11 as selected by means of the respective rotary-barrel-like input device 24, specifically into a display mode or interaction mode of the display menu or interaction menu of the respective display device 13 or 14 of the instrument cluster 11 hierarchically superordinate to the respective selected display mode or interaction mode.

As a result of the assignment of the operating devices 22 and 23 of the steering wheel 15 to the display devices 13 and 14 on the same sides, respectively, of the instrument cluster 11, it is possible for the driver to more easily and reliably access display modes or interaction modes and data, displayed within the display modes, of the display devices 13 and 14 of the instrument cluster 11. The functionality, in particular operator convenience, of a display and operating system of a motor vehicle is increased in this way.

In addition to the operating devices 22 and 23, the steering wheel 15 is assigned a further operating device 26 which is an operating mode selecting device. By means of the operating mode selecting device 26, one of several operating modes of the motor vehicle in the form of a hybrid vehicle can be selected or activated, preferably at least one of the operating modes of purely electric-motor-powered driving and/or purely combustion-engine-powered driving and/or combined electric-motor-powered and combustion-engine-powered driving and/or electric-motor-powered boosting as a special case of combined electric-motor-powered and combustion-engine-powered driving. The selection of the relevant operating mode by means of the operating mode selecting device 26 is performed by the driver of the motor vehicle, and therefore at the driver's side.

Figure 3:
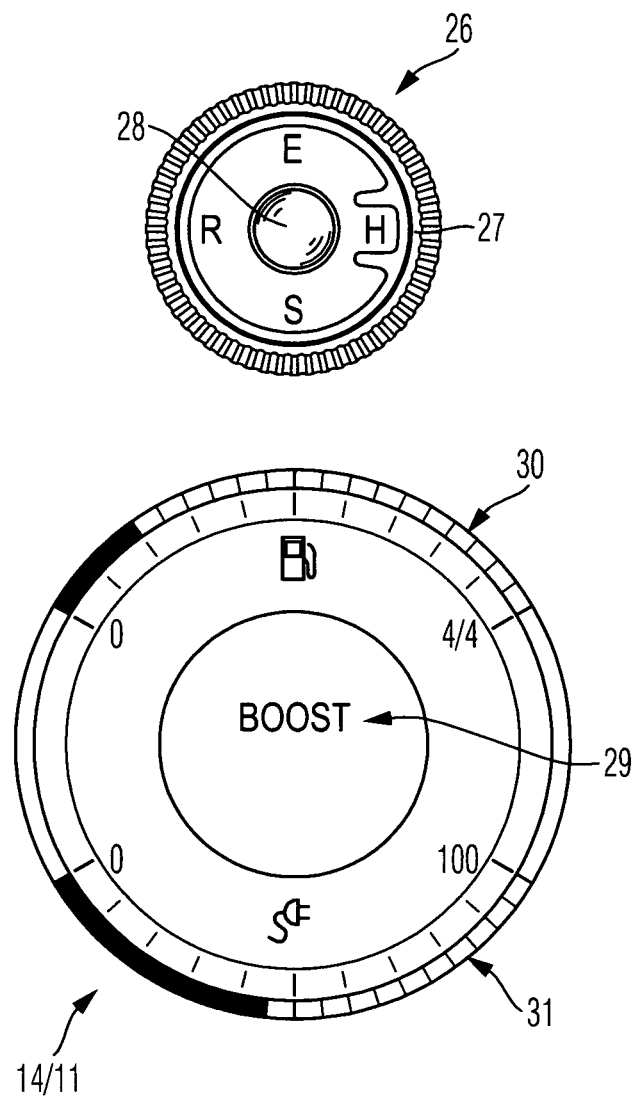
FIG. 3 shows a further detail of the display and operating system according to the invention of FIG. 1.

Details of the operating mode selecting device 26 emerge from FIG. 3. It can be seen from FIG. 3 that the operating mode selecting device 26 comprises an outer rotatable selecting element 27 and a button-like boost selecting element 28.

As a result of the rotation of the rotatable selecting element 27 by a driver, one of several operating modes can be selected or activated by the driver, specifically one of the operating modes H, E, S and R as per FIG. 3, wherein the operating mode E is purely electric-motor-powered driving, the operating mode H is combined electric-motor-powered and combustion-engine-powered driving, the operating mode S is combined fuel-minimized electric-motor-powered and combustion-engine-powered driving under sport conditions, and the operating mode R is combined electric-motor-powered and combustion-engine powered driving under race conditions. It is pointed out that the operating modes H, E, S and R which can be selected by the driver by means of the rotatable selecting element 27 as shown in FIG. 3 are merely exemplary.

For example, an operating mode for purely combustion-engine-powered driving may additionally be provided. It is also possible for the operating modes R and S for combined electric-motor-powered and combustion-engine-powered driving under sport conditions and race conditions respectively not to be provided.

As already mentioned, the operating mode selecting device 26 has not only the rotatable selecting element 27 but rather also the button-like boost selecting element 28 by means of which electric-motor-powered boosting as a special case of combined electric-motor-powered and combustion-engine-powered driving can be selected or activated by the driver. Here, the button-like boost selecting element 28 is arranged in the center of the rotatable selecting element 27 and therefore in the center of the operating mode selecting device 26.

When electric-motor-powered boosting is activated as an operating mode by the driver through actuation of the boost selecting element 28, it is the case, as can be seen in FIG. 3, in the preferred exemplary embodiment of the display and operating system according to the invention, that in a corresponding display mode of the right-hand display device 14 of the instrument cluster 11, the operating mode BOOST, which stands for electric-motor-powered boosting, is displayed in alphanumeric form in a display area 29 of said right-hand display device.

As can also be seen from FIG. 3, the display device 14 of the instrument cluster 11 has further display areas 30 and 31, specifically a display area 30 for displaying a fill level of a fuel tank and a display area 31 for displaying a state of charge of an electrical energy store.

In one advantageous refinement of the invention, a backlighting of at least one of the display devices 12, 13 and 14 of the instrument cluster 11, in particular a backlighting of all of the display devices 12, 13, 14, 16 and 17 and of all of the operating devices of the motor vehicle, is adapted or changed as a function of the operating mode selected or activated by the driver by means of the operating mode selecting device 26. For example, it is possible for the backlighting of the display devices and operating devices to be of a first color, for example green, in the case of purely electric-motor-powered driving and in the case of fuel-minimized combined electric-motor-powered and combustion-engine-powered driving.

By contrast, it is for example possible for the backlighting to be of a second color, for example red, in other operating modes, for example in the case of purely combustion-engine-powered driving or in the case of combined electric-motor-powered and combustion-engine-powered driving under sport conditions or race conditions. The activated operating mode of the vehicle is then readily apparent or identifiable for the driver from the backlighting, and therefore from the overall appearance of the display and operating system. In this connection, the light color of interior space lights of the motor vehicle, for example the color of an ambient lighting system of the motor vehicle, may also change.

Figure 2:
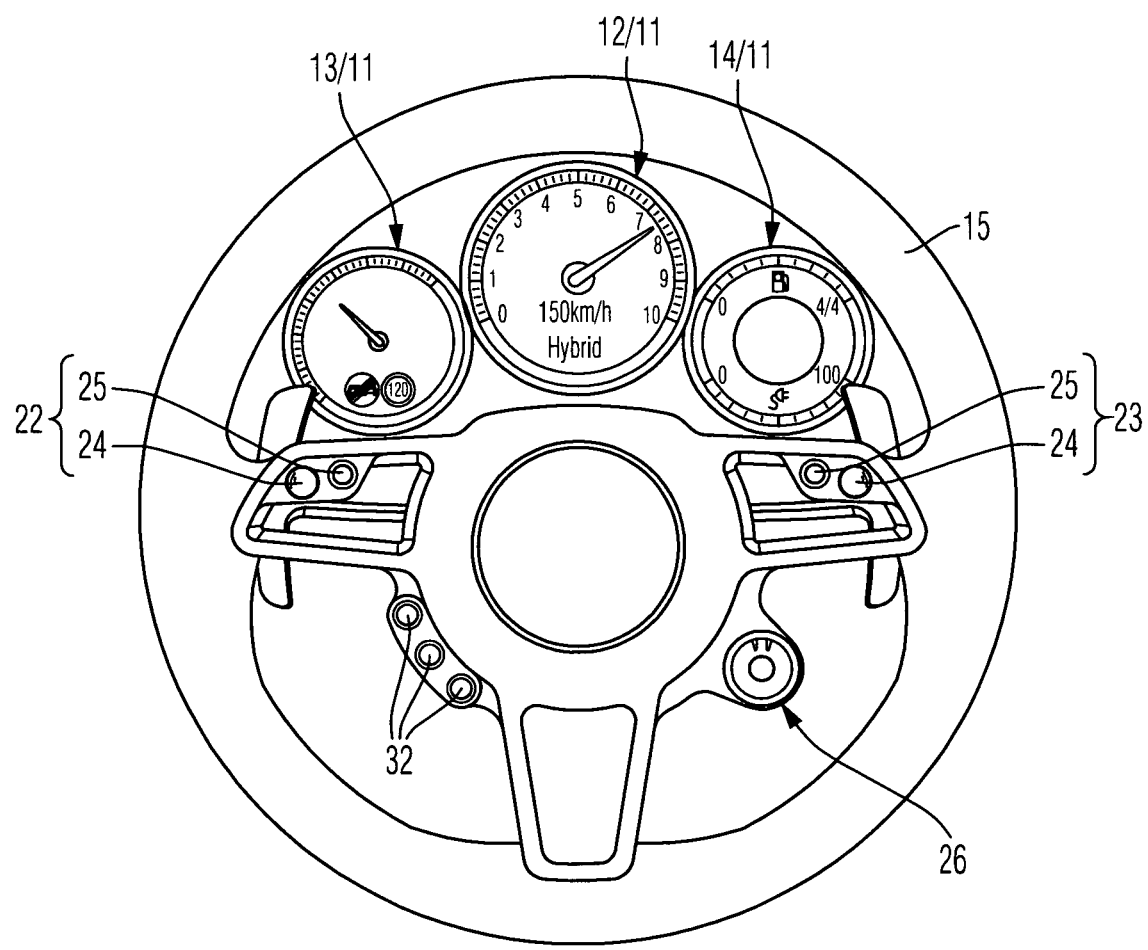
FIG. 2 shows a detail of the display and operating system according to the invention of FIG. 1.

It can be seen from FIG. 2 that further operating devices 32 are installed on the steering wheel 15, wherein defined functions of the motor vehicle, for example a main beam function or a vehicle speed limiter function or a function for activating windshield wipers of the motor vehicle, can be accessed directly by means of said button-like operating devices 32.

Figure 4:
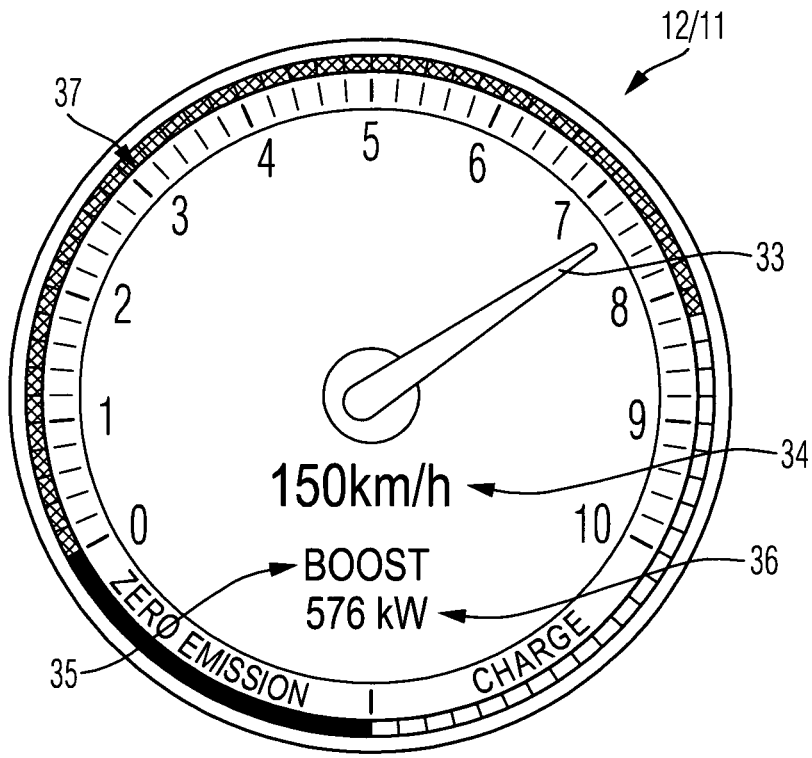
FIG. 4 shows a further detail of the display and operating system according to the invention of FIG. 1 in a first state.
Figure 5:
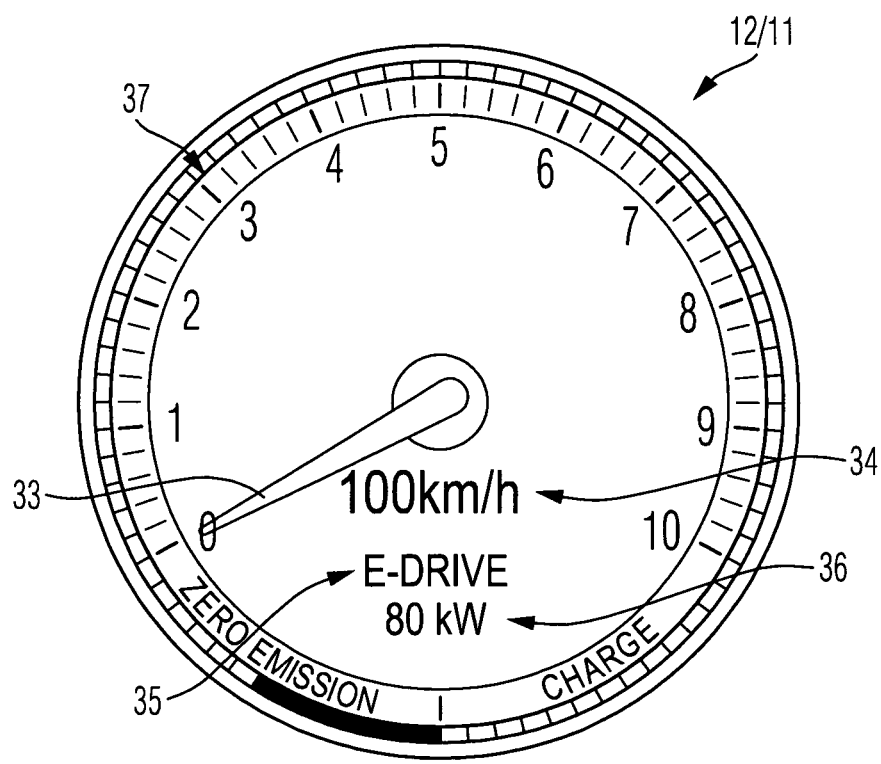
FIG. 5 shows the detail of FIG. 4 in a second state.
Figure 6:
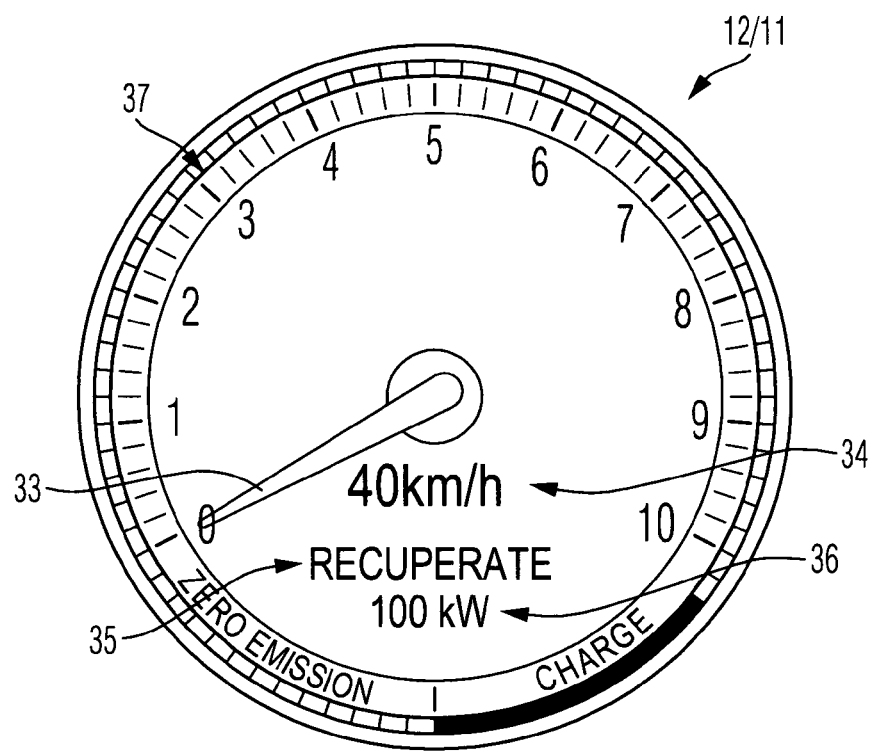
FIG. 6 shows the detail of FIG. 4 in a third state.

As already stated, the central display device 12 of the instrument cluster 11, which is shown on its own in different display states in FIGS. 4 to 6, is in particular the display for an engine speed of the combustion engine, wherein for this purpose the display device 12 has an engine speed pointer 33.

In addition to the engine speed pointer 33, the display device 12 of the instrument cluster 11 additionally comprises display areas in which additional information for the driver can be displayed, for example a display area 34 for displaying the present driving speed and a display area 35 for displaying the active operating mode.

Here, the display region 35 displays the operating mode BOOST or electric-motor-powered boosting in FIG. 4, the operating mode E-DRIVE or purely electric-motor-powered driving in FIG. 5, and the operating mode RECUPERATE, specifically as a special case of driving with recuperation by means of an electric machine, in FIG. 6, wherein during recuperation, an electrical energy store of the hybrid vehicle is charged for example during braking. Here, the operating mode RECUPERATE cannot be selected by the driver, rather is automatically activated by a hybrid control unit.

Furthermore, in one advantageous refinement of the invention, further display areas are provided, specifically a display area 36 for a quantitative power display and a display area 37 for a qualitative power display of the drive assembly, specifically in particular of a hybrid drive.

The display area 36 which serves for a quantitative power display can alphanumerically display the total power, provided by the combustion engine and the electric motor, acting in the drivetrain. Here, in FIG. 4, a total power of 576 kW is displayed in the display area 36 for the operating mode BOOST, said total power being provided to the drivetrain during traction operation by the combustion engine and by the or each electric machine of the hybrid drive. In FIG. 5, a total power in traction operation of 100 kW is displayed for the operating mode E-DRIVE, and in FIG. 6, 80 kW is the total power for the operating mode RECUPERATE, wherein recuperation involves overrun power.

By contrast, in the radially outer display area 37, the power acting in the drivetrain can be displayed, subdivided into electric motor power and combustion engine power. Here, in the radially outer display area 37, electric motor power and combustion engine power are preferably displayed in different colors and in different angle ranges of the display device 12.

LCD displays are installed in the region of all of the display devices 12, 13 and 14 of the instrument cluster 11. Said LCD displays are preferably circular LCD displays which are adapted in terms of their contour to the contour of the display device, as a result of which, firstly, optimum integration of LCD displays into respective display devices 12, 13 and 14 is then permitted, and secondly, display areas of the display devices 12, 13 and 14 positioned at a radially outer edge of the respective display device can also be provided by means of the LCD display, as a result of which it is then possible to dispense with LEDs which are otherwise conventional in said radially outer display areas.

While the invention has been particularly shown and described with reference to preferred embodiments thereof, it will be understood by those skilled in the art that various changes in form and details may be made therein without departing from the spirit and scope of the invention.

The invention claimed is:
1. A display and operating system of a motor vehicle, the display and operating system comprising:

an instrument cluster formed by a plurality of display devices and including an outer left-hand display device and an outer right hand display device;

a steering wheel including:
an outer left-hand operating device configured exclusively for driver interaction with the outer left-hand display device of the instrument cluster and an outer right-hand operating device configured exclusively for driver interaction with the outer right-hand display device of the instrument cluster, each of the outer left-hand operating device and the outer right-hand operating device having two input devices including:
one rotary-barrel-like input device configured for selecting and confirming a display mode of the respective outer display device of the instrument cluster, and
one button-like input device configured for returning to a display mode of the respective outer display device of the instrument cluster that is superordinate to
the respectively selected display mode; and
an operating mode selecting device configured to select at least one operating mode from the group including purely electric-motor-powered driving, purely combustion-engine-powered driving, combined electric-motor-powered and combustion-engine-powered driving, and electric-motor-powered boosting as a special case of combined electric-motor-powered and combustion-engine-powered driving, the operating mode selecting device including:
a rotatable selecting element configured for driver selection of at least one of the operating modes including purely electric-motor-powered driving combined electric-motor-powered and combustion-engine-powered driving, and
a button-like boost selecting element configured for driver selection of the electric-motor-powered boosting; and
further devices including at least one of a display device or an operating device disposed laterally adjacent to the instrument cluster.

2. The display and operating system recited in claim 1, wherein the further devices are disposed in a region of or as an extension of a central console.

3. The display and operating system recited in claim 1, wherein a backlighting of at least one of the display devices or operating devices is configured to change as a function of an operating mode selected using the operating mode selecting device.

4. The display and operating system recited in claim 3, wherein the change in the backlighting is a change in color.

5. The display and operating system recited in claim 1, wherein the button-like boost selecting element is disposed in a center of the rotatable selecting element.

6. The display and operating system recited in claim 1, wherein at least one display device of the instrument cluster includes a first display area for quantitative power display and a second display area for qualitative power display.

7. The display and operating system recited in claim 6, wherein a central display device of the instrument cluster includes a first display area for quantitative power display and a second display area for qualitative power display.

8. The display and operating system recited in claim 6, wherein the first display area is configured to alphanumerically display a total power acting in a drivetrain of the motor vehicle for the quantitative power display.

9. The display and operating system recited in claim 6, wherein the second display area is configured to display at least one of electric motor power and combustion engine power acting in a drivetrain of the motor vehicle for qualitative power display.

10. The display and operating system recited in claim 1, wherein at least one display device of the instrument cluster includes a circular LCD display.

\* \* \* \* \*